US007956302B1

(12) United States Patent
Jean et al.

(10) Patent No.: US 7,956,302 B1
(45) Date of Patent: Jun. 7, 2011

(54) HERMETICALLY PACKAGED MEMS G-SWITCH

(75) Inventors: Daniel Jean, Odenton, MD (US); Ezra Chen, Laurel, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 594 days.

(21) Appl. No.: 12/069,001

(22) Filed: Jan. 16, 2008

(51) Int. Cl.
*H01H 35/02* (2006.01)
*H01H 35/14* (2006.01)
*G01P 15/135* (2006.01)

(52) U.S. Cl. .............................. 200/61.45 R; 200/61.49

(58) Field of Classification Search ............ 200/61.45 R
See application file for complete search history.

(56) References Cited

U.S. PATENT DOCUMENTS 5,962,789 A * 10/1999 Matsunaga et al. ........ 73/514.38
6,313,418 B1 11/2001 Reneau
6,586,691 B2 * 7/2003 Itoigawa et al. ........... 200/61.49
6,619,123 B2 9/2003 Gianchandani et al.
6,737,979 B1 5/2004 Smith et al.
6,765,160 B1 7/2004 Robinson
6,797,899 B2 * 9/2004 Itoigawa et al. ........... 200/61.48
7,009,124 B2 * 3/2006 Chen et al. ............. 200/61.45 R
7,038,150 B1 5/2006 Polosky et al.

* cited by examiner

*Primary Examiner* — Edwin A. Leon
*Assistant Examiner* — Lheiren Mae A Caroc
(74) *Attorney, Agent, or Firm* — Fredric J. Zimmerman

(57) ABSTRACT

A hermetically packaged G-switch includes a MEMS structure having a bottom substrate layer, a top device layer and an intermediate oxide layer. A mass disposed in the top device layer is connected to one, two or three anchor portions using spring arms. One end of a spring arm is connected to the mass and another end to an anchor portion. The connection to the anchor portion includes a T shaped arrangement, which has a torsional spring cross piece connected to the spring arm. A cap containing a conductive pad is hermetically sealed to the MEMS structure. When a predetermined acceleration is attained, the mass makes electrical contact with the conductive pad to close the G-switch.

11 Claims, 10 Drawing Sheets

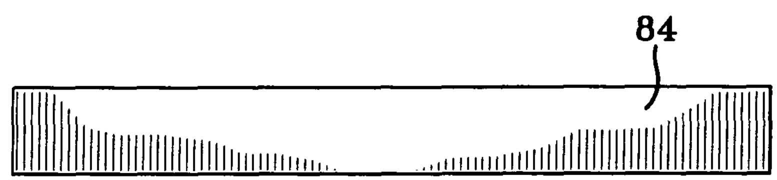
FIG-4A
84
32
FIG-4B
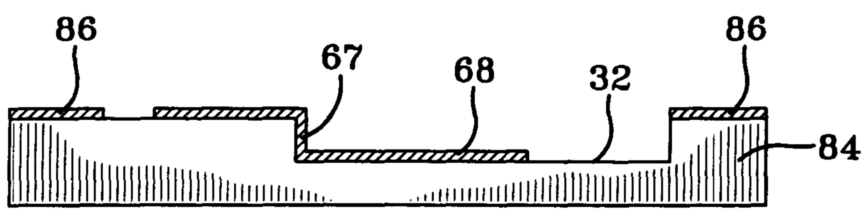
FIG-4C

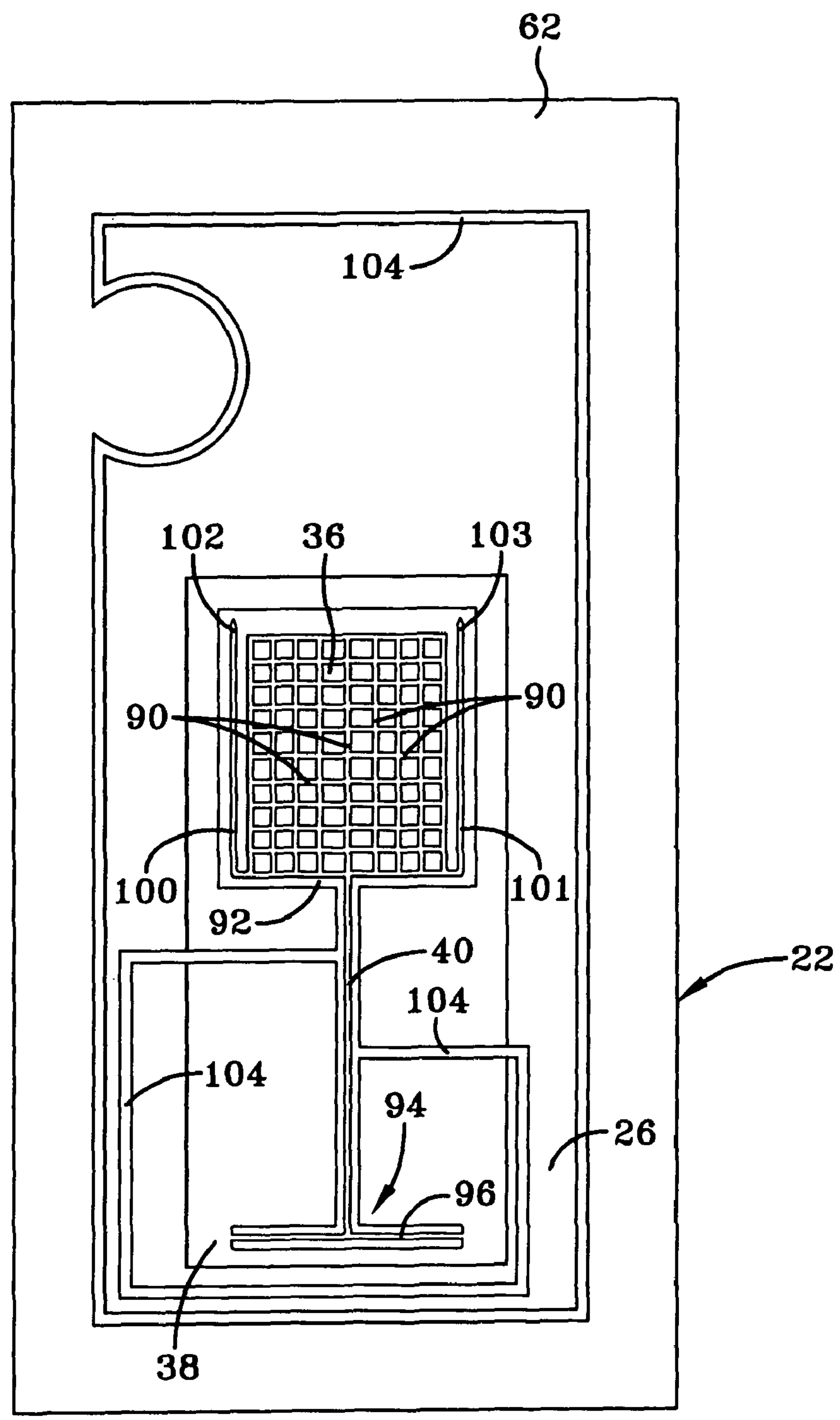
FIG—5

HERMETICALLY PACKAGED MEMS G-SWITCH

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

The invention relates in general to acceleration sensors and in particular to MEMS type acceleration sensors.

Acceleration sensors and switches are used in various commercial and military applications, for example, projectiles that carry explosives. Acceleration sensors that close an electrical circuit upon impact of a projectile are often called impact sensors or G-switches (Gravity switches) or PD (point detonating) switches. Micro-electro mechanical systems (MEMS) are used in the fuzes and safe and arm systems of some projectiles. MEMS devices are small, lightweight, accurate, reliable and often cheaper than conventional devices. The MEMS G-switches shown in U.S. Pat. Nos. 6,737,979 and 6,619,123 move only in the plane of the substrate and are not able to filter out large cross axis accelerations that may be induced by spin.

U.S. Pat. Nos. 6,765,160 and 7,038,150 show MEMS type acceleration switches designed for movement out of the plane of the substrate. As these devices use folded springs to support the mass, the mass is also able to move in the plane of the substrate, which can lead to binding of the mass during spinning of the projectile. In addition, the mass has a relatively large surface area that contacts the contact pad, resulting in high contact resistance and switch bounce. Furthermore, the device in U.S. Pat. No. 7,038,150 uses a mass that is 8 to 300 times thicker than the springs, thereby complicating the manufacturing process.

SUMMARY OF THE INVENTION

It is an object of the invention to provide a MEMS type G-switch that will not bind during use.

Another object is to provide a MEMS type G-switch that is exceptionally small and will operate during high spin rates.

A MEMS G-switch structure is provided having a bottom substrate layer, a top device layer and an intermediate oxide layer joining the bottom and top layers. At least one anchor portion is defined in the device layer. The device layer includes a mass moveable out of the plane of the device layer, and at least one spring arm having a first end connected to the mass and a second end connected to the anchor portion. The connection of the spring arm to the anchor portion includes a T arrangement having a torsional spring cross piece connected to the second end of the spring arm to provide for greater flexibility of the mass and spring arm. A cap is provided with the cap being hermetically sealed to the MEMS structure. The cap includes a conductive pad, and the top of the mass also includes a conductive pad which engages the conductive pad of the cap when a predetermined acceleration of the switch is attained.

The invention will be better understood, and further objects, features, and advantages thereof will become more apparent from the following description of the exemplary embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIGS. 4A to 4C illustrate steps in the fabrication of the cap of FIG. 2.

FIG. 5 is a plan view along the line 5-5 of FIG. 2A.

DETAILED DESCRIPTION OF THE EXEMPLARY EMBODIMENTS

The invention comprises a MEMS type acceleration switch. In some embodiments, the switch is non-latching. One of many exemplary applications for the invention is an impact detection sensor in a 25 mm ordnance round.

Figure 1:
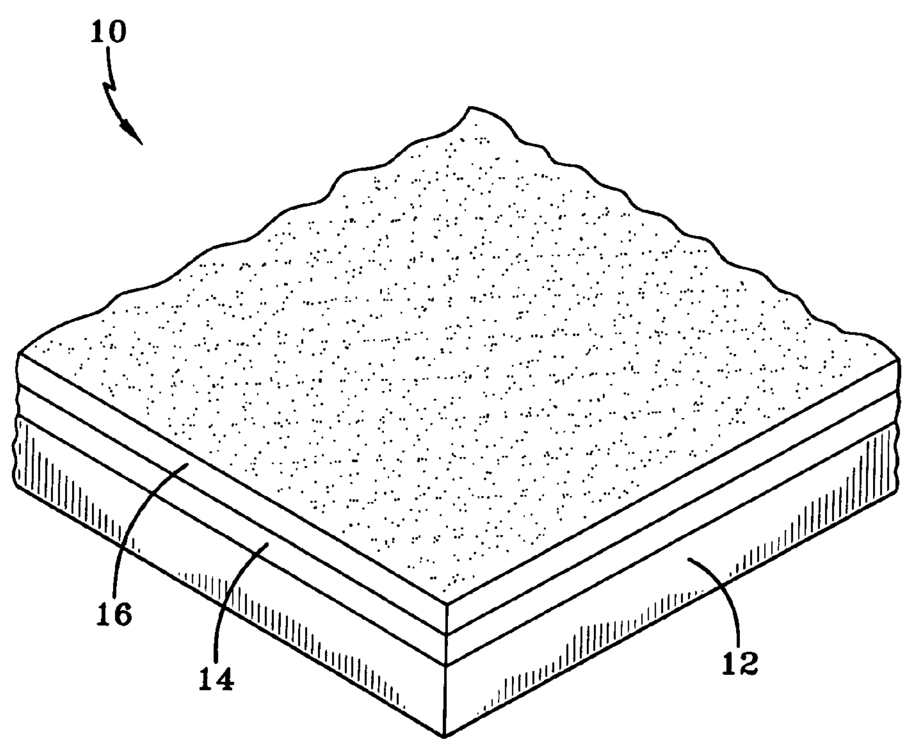
FIG. 1 illustrates an SOI (silicon on insulator) wafer prior to fabrication of the MEMS switch of the present invention.

FIG. 1 illustrates a portion of an SOI (silicon on insulator) wafer 10 from which the switch of the present invention will be fabricated. The structure of FIG. 1 includes a silicon substrate 12 (also known as a bottom or handle layer) covered by an insulating layer 14, such as silicon dioxide, over which is deposited another silicon layer 16 (also known as the top or device layer), which is the layer from which the moveable parts of the switch will be fabricated.

Figure 2A:
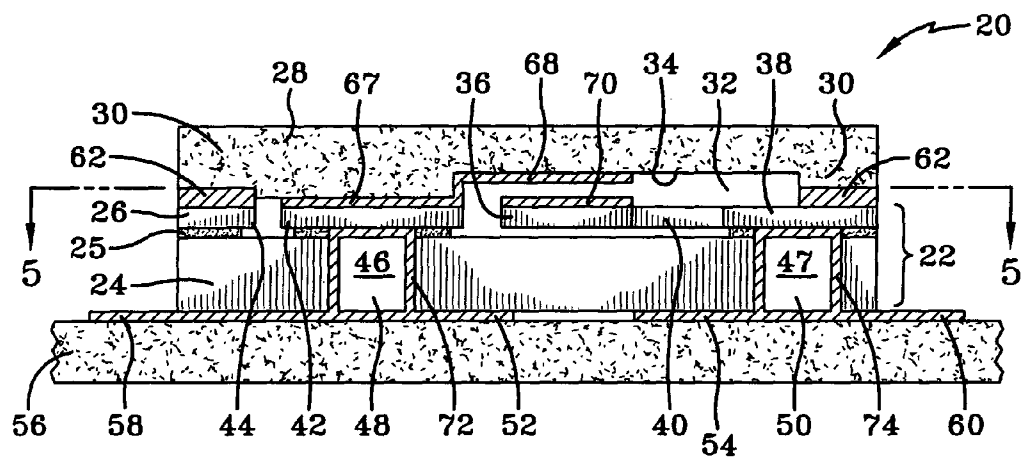
FIGS. 2A and 2B are sectional views of the switch in an open and closed position.
Figure 2B:
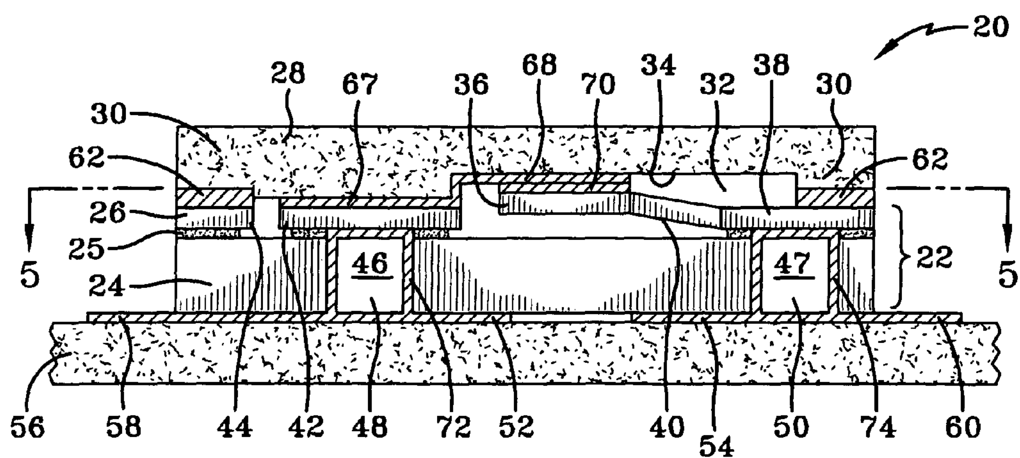

FIGS. 2A and 2B are sectional views of a G-switch 20 formed from a wafer similar to wafer 10 of FIG. 1, in respective open and closed positions. The switch 20 is fabricated from an SOI structure 22 having a substrate 24, an insulating layer 25 and a device layer 26. A cap wafer 28 is hermetically sealed to the SOI structure 22 and includes a peripheral ridge 30 defining a cavity 32 having a ceiling 34 where the cavity 32 is intermediate the SOI structure 22 and the cap wafer 28.

The device layer 26 includes a moveable mass 36 connected to an anchor portion 38 by means of a spring arm 40. Also included in the device layer 26 are a feedthrough pad 42 and a seal portion 44. The substrate 24 includes a first spaced apart cavity 46 and a second spaced apart cavity 47, which are both filled with electrically conductive materials 48 and 50, respectively.

An electrically conductive layer is applied to various portions of the device. More particularly, the bottom of substrate 24 includes a first electrically conductive layer 52 and a second electrically conductive layer 54, which are both attached to a base, such as, circuit board 56. Electrically conductive layers 58 and 60, which are in the same plane, on the circuit board 56 form electrical extensions of the electrically conductive layers 52 and 54, respectively. In an exemplary embodiment, these electrically conductive layers may be comprised of a thin adhesion layer, such as chromium or the like, on which is deposited a thicker layer of gold.

The device layer 26 has an electrically conductive layer around the periphery thereof, and the cap 28 has a similar layer on the peripheral ridge 30. These two electrically conductive layers form a hermetic seal 62 for switch 20. Electrically conductive layer 67 is applied to the undersurface of cap wafer 28 and includes a conductive pad portion 68 on the ceiling 34 of cavity 32. Conductive pad 68 makes electrical contact with electrically conductive layer 70 on top of mass 36 when the switch is in a closed position, as in FIG. 2B. To ensure good adhesion of the conductive material 48 and 50 in cavities 46 and 47, these cavities are lined with electrically conductive layers 72 and 74, respectively.

When the ordnance round in which the switch 20 is located strikes a target, the mass 36 attains a predetermined acceleration and moves from the position illustrated in FIG. 2A to that of FIG. 2B to complete an electrical circuit. The current flow path includes electrically conductive layer 58, electrically conductive layer 52, conductive material 46, feedthrough pad 42, electrically conductive layer 67, conductive pad 68, conductive pad 70, mass 36, spring arm 40, anchor portion 38, conductive material 47, electrically conductive layer 54 and electrically conductive layer 60, or vice versa.

In an exemplary embodiment, the switch may be formed by a DRIE (deep reactive ion etching) process that removes unwanted portions of layer 26 and substrate 24. The DRIE process is a well developed micromachining process used extensively with MEMS devices and, in particular, silicon based MEMS devices. For this reason, in an exemplary embodiment, silicon is a material for the switch of the present invention, although other materials are possible.

Figure 3A:
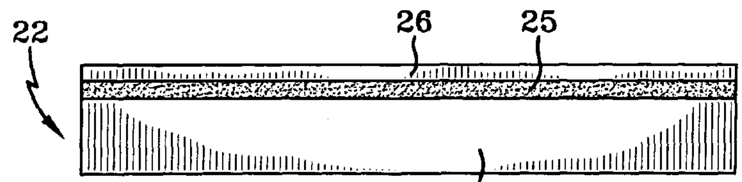
FIGS. 3A to 3G illustrate steps in the fabrication of the switch of FIG. 2.
Figure 3B:
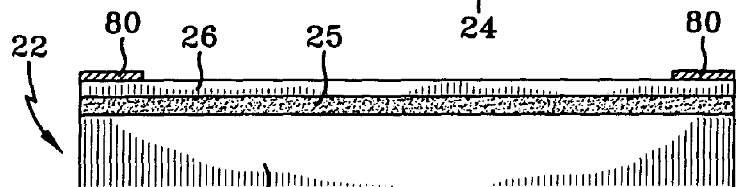
Figure 3C:
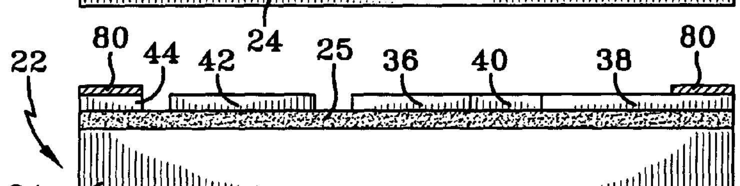
Figure 3D:
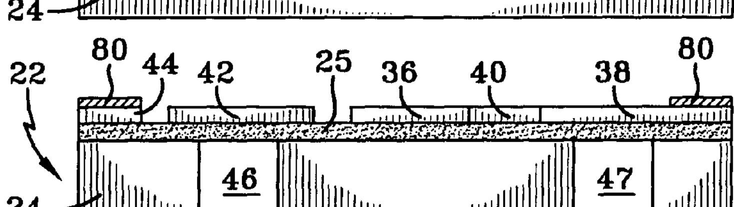

FIGS. 3A to 3G illustrate a method of fabricating the SOI structure of FIG. 2. The fabrication starts with the SOI structure 22 of FIG. 3A. In an exemplary embodiment, by way of example, the substrate 24 may have a thickness of about 500 μm (microns), the oxide layer about 2 μm thick and the device layer about 20 μm thick. In FIG. 3B, a layer 80 of chromium and gold is deposited for the hermetic seal. After a DRIE process, the resulting structure is as illustrated in FIG. 3C which includes the seal portion 44, feedthrough pad 42, mass 36, spring arm 40 and anchor portion 38. The same DRIE process is applied to the substrate 24 to form the first cavity 46 and the second cavity 47, as illustrated in FIG. 3D.

Figure 3E:
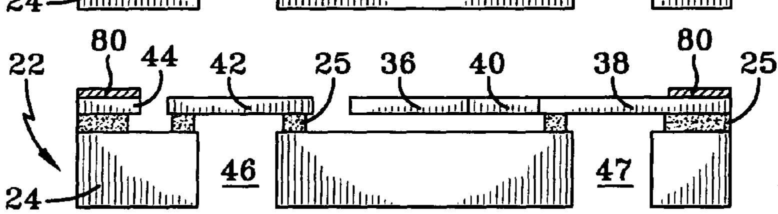

To operate as a switch, the mass 36 and spring arm 40 must be free to move and therefore must be free of any underlying silicon dioxide insulating layer 25. One way to accomplish the removal of the underlying insulating layer, and as illustrated in FIG. 3E, is by applying an etchant, such as, hydrofluoric acid, which will dissolve the silicon dioxide. To shorten the time for dissolving the silicon dioxide under mass 36, and as will be subsequently illustrated, the mass is provided with a series of apertures which extend from the top surface down to the insulating layer 25, thereby allowing the etchant direct access to the silicon substrate. Although some of the etchant dissolves the insulation under the seal portion 44, feedthrough pad 42 and anchor portion 38, the process of freeing the mass 36 is completed before these components are completely freed so that they remain immovable.

Figure 3F:
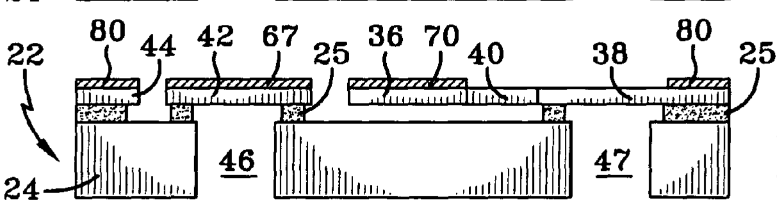
Figure 3G:
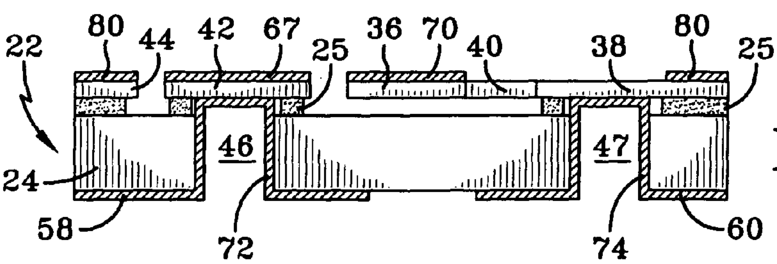

In FIG. 3F, the electrically conductive layers 67 and 70 are applied to the feedthrough pad 42 and mass 36, respectively and in FIG. 3G, the remainder of the electrically conductive layers 58, 60 72 and 74 are applied to the bottom of substrate 24 and to the interior of both the first cavity 46 and the second cavity 47. Switch 20 is one of a multitude of similar switches fabricated on the same wafer, with all of the switches being separated after fabrication for use as individual switches.

The fabrication of the cap 28 is illustrated in FIGS. 4A to 4C. As illustrated in FIG. 4A, the fabrication starts with a wafer 84 of a material, such as, Pyrex® or silicon (conductive or non-conductive), by way of example, which may have a thickness of about 300 μm. In FIG. 4B, the wafer is etched down around 10 μm to form cavity 32. The electrically conductive layer deposition is illustrated in FIG. 4C and includes electrically conductive layers 86, which are bonded with electrically conductive layer 80 (FIG. 3C) to form the hermetic seal 62 (FIG. 2), and electrically conductive layer 67. The caps 28 may be formed on a wafer containing a multitude of such caps and then bonded to the wafer containing the multitude of structures illustrated in FIG. 3G, resulting in the packaging of hundreds of switches which may then be separated for individual use.

FIG. 5, which is a view along line 5-5 of FIG. 2A, illustrates the device layer 26 and mass 36 in more detail. The mass 36 includes a plurality of apertures 90 to allow the hydrofluoric acid to free it from the underlining oxide layer during fabrication, as previously noted. One end of spring arm 40 is connected to the back 92 of mass 36. The other end is connected to a T arrangement 94 with the cross piece 96 thereof having first and second ends connected to the anchor portion 38. The crosspiece 96 serves as a torsional spring which gives flexibility to the unit.

Figure 5A:
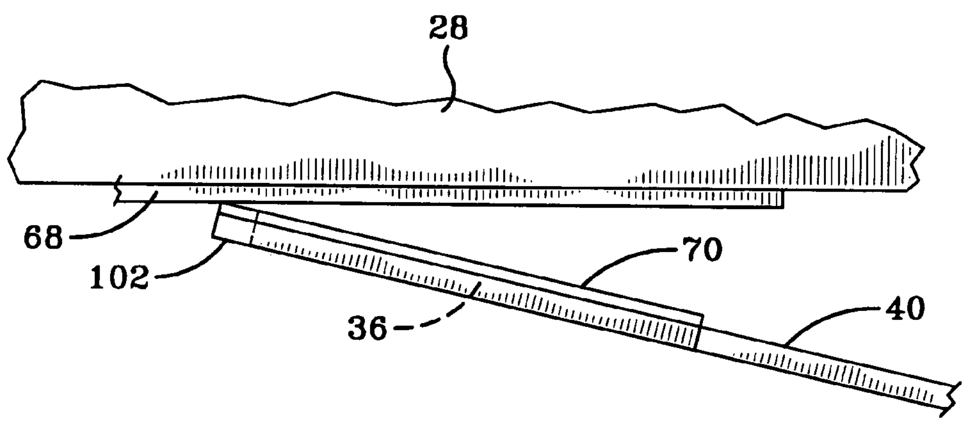
FIG. 5A is a view of engagement of contact points with a conductive pad.

Extending from the back 92 on either side of mass 36 are first contact arm 100 and second contact arm 101, at the ends of which are respective contact points 102 and 103. When the switch 20 is accelerated sufficiently to move the mass 36 toward the contact pad 68, and as illustrated in FIG. 5A, the contact points 102 and 103 will touch the contact pad 68 prior to the mass 36. With this arrangement the contact points establish a very low resistance, which is maintained even after the mass 36 engages the contact pad 68. Further, the arrangement reduces, if not eliminates, any contact bounce.

Referring once again to FIG. 5, the device layer 26, in an exemplary embodiment, is composed of an electrically conducting silicon. Accordingly, a series of grooves 104 extending down to the oxide layer is provided to maintain electrical isolation among the various components.

Figure 6:
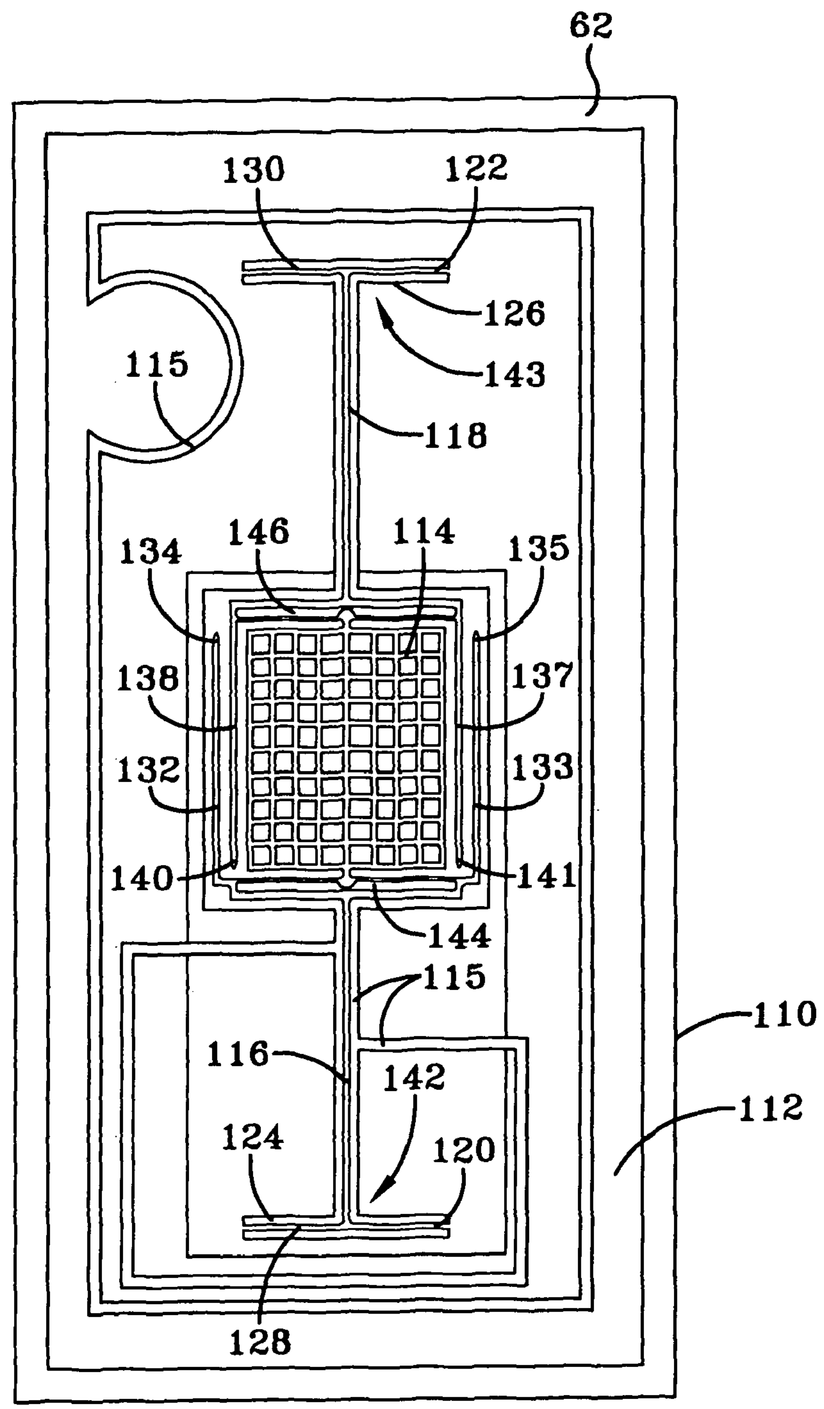
FIG. 6 is a plan view of another embodiment of the present invention.

FIG. 6 is a view similar to FIG. 5 showing an embodiment which utilizes two spring arms. SOI structure 110 includes a device layer 112 from which is formed the apertured mass 114 and which includes electrical isolation grooves 115. The mass 114 has two spring arms 116 and 118 connected to respective anchor portions 120 and 122. The spring arm connection is via respective T shaped arrangements 142 and 143, which include torsional springs 128 and 130, to provide flexure to the structure.

The mass 114 includes four contact arms. First contact arm 132 and second contact arm 133 are connected to a first end of mass 114, and have respective contact points 134 and 135 at the ends thereof. A third contact arm 138 and a fourth contact arm 137 have respective contact points 140 and 141 for the purpose previously stated, and the third contact arm 138 and the fourth contact arm 137 are connected to a second end of mass 114. These contact arms 132, 133, 137 and 138 are connected to the ends of mass 114 by means of respective torsional springs 144 and 146. These torsional springs allow the contact arms to rotate out of the plane of the mass 114, as opposed to the embodiment of FIG. 5 where the arms remain in the plane of the mass 36.

Figure 6A:
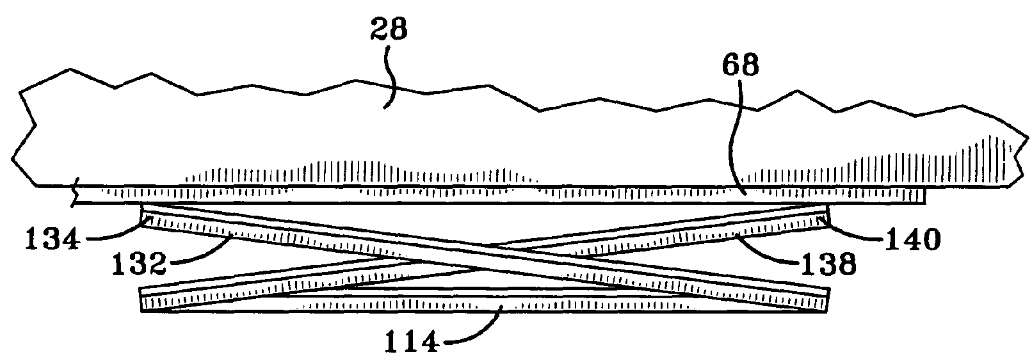
FIG. 6A is a view of engagement of contact points with a conductive pad.

FIG. 6A illustrates movement of the mass 114 and visible contact arms 132 and 138. When the switch impacts a target, mass 114 starts to move toward the conductive pad 68. By virtue of the torsional spring connection of the contact arms 132 and 138 (as well as 133 and 137), these contact arms rotate upward and precede the mass 114 and engage contact pad 68 prior to the mass 114, thus providing for a low resistance contact that is maintained after mass 114 engages the contact pad.

Figure 7:
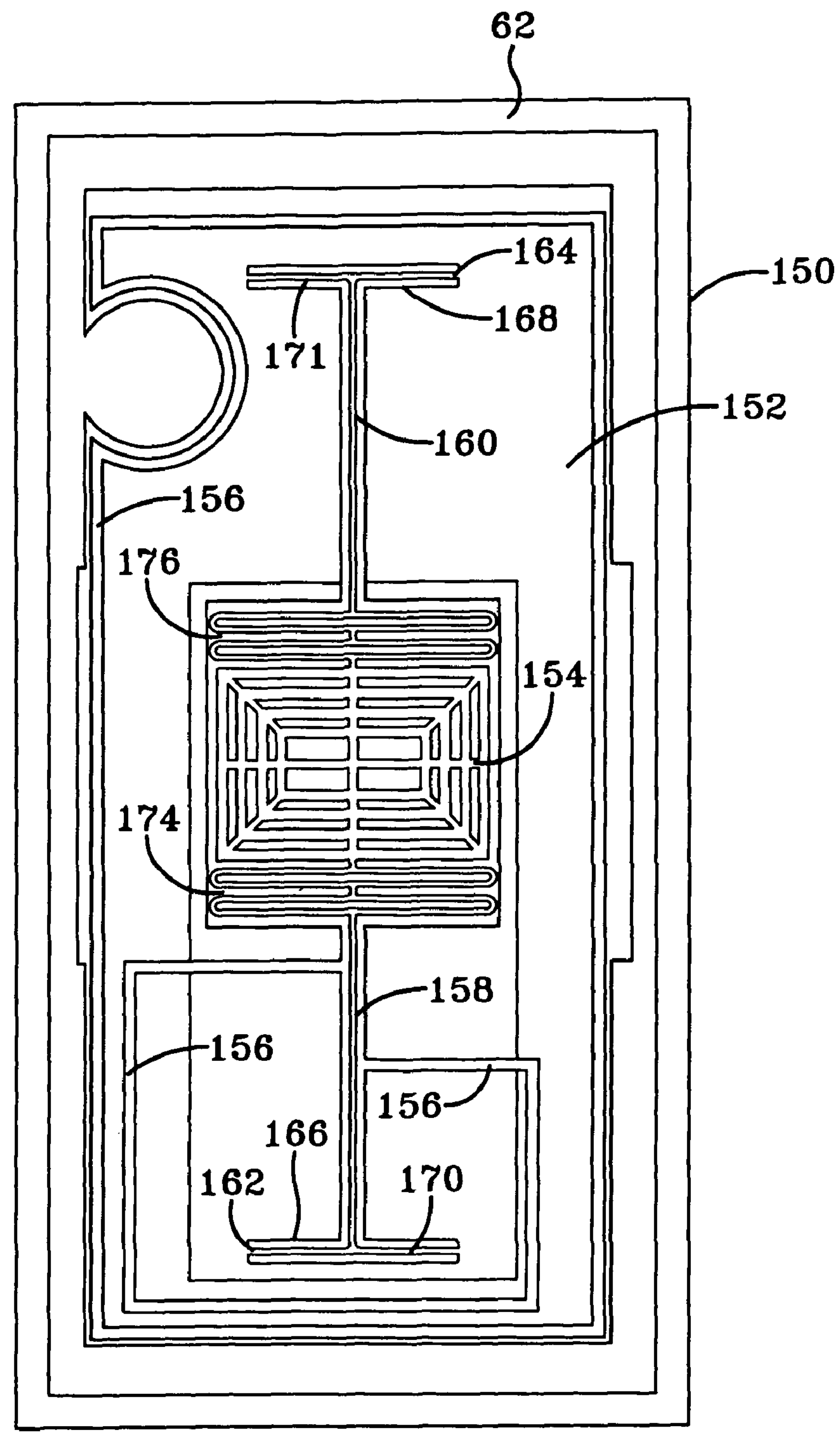
FIGS. 7 and 8 illustrate plan views of two other embodiments of the present invention.

SOI structure 150 in an exemplary embodiment of FIG. 7 includes a device layer 152 from which is formed the apertured mass 154 and which includes electrical isolation grooves 156. The mass 154 has two spring arms 158 and 160 connected to respective anchor portions 162 and 164. The spring arm connection is via T arrangements 166 and 168 which include respective torsional springs 170 and 171, to provide flexure to the structure.

Additional flexure is provided by the connection of the mass 154 to the spring arms 158 and 160. More particularly, mass 154 is connected to spring arm 158 by means of a folded or serpentine, that is, S-shaped, spring 174 and is connected to spring arm 160 by means of folded or serpentine, that is, S-shaped, spring 176.

Figure 8:
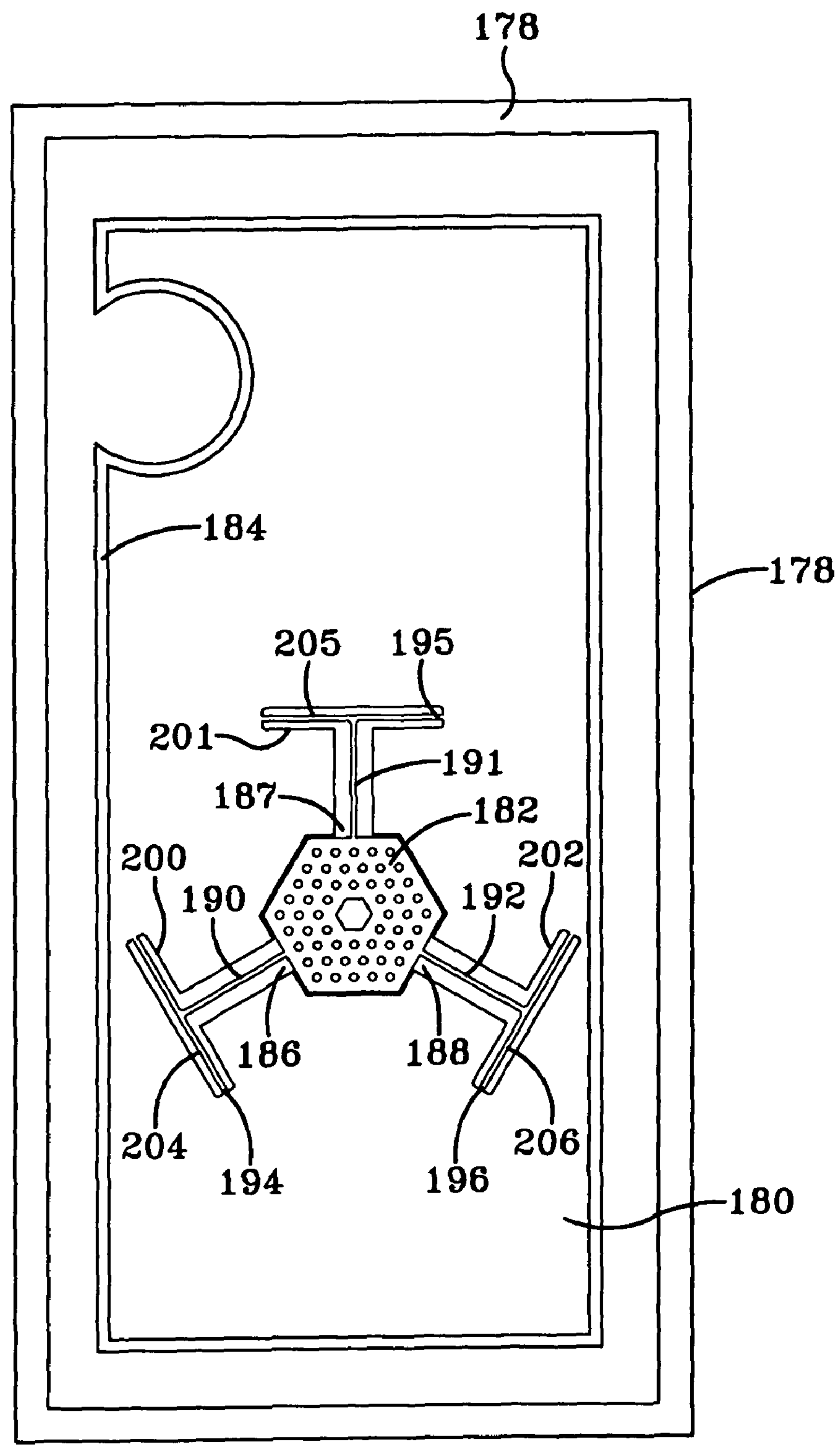

FIG. 8 is a view also similar to FIG. 5 showing an embodiment that utilizes three spring arms, which gives increased resistance to lateral loads. SOI structure 178 includes a device layer 180 from which is formed the apertured mass 182 and which includes electrical isolation grooves 184. The mass 182 has three attachment points 186, 187 and 188 to which are connected the first ends of respective spring arms 190, 191 and 192. These spring arms 190, 191, and 192 are connected to respective anchor portions 194, 195 and 196. The connection of the spring arms is via respective T arrangements 200, 201 and 202, which include respective torsional springs 204, 205 and 206, to provide additional flexure to the structure.

There has been described a G switch which responds to a relatively low impact acceleration while undergoing several hundred or thousand lateral Gs from the spinning round in which it is mounted. Although the invention has been described with respect to use in an ordnance round, it may be used in other embodiments. For example, the device is a low power alternative to accelerometers and may be used in sports helmets and the shipping industry, by way of example.

While the invention has been described with reference to certain preferred embodiments, numerous changes, alterations and modifications to the described embodiments are possible without departing from the spirit and scope of the invention as defined in the appended claims, and equivalents thereof.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A hermetically packaged MEMS G-switch, comprising:

a MEMS structure comprising a bottom substrate layer, a top device layer and an intermediate oxide layer joining said bottom substrate and top device layers;

at least one anchor portion being defined in said top device layer;

a mass disposed in said top device layer, said mass is moveable cut of a plane of said top device layer where said mass includes a conductive pad on a top portion thereof;

at least one spring arm comprising a first end connected to said mass and a second end connected to said anchor portion, a connection of said at least one spring arm to said anchor portion where the connection includes a T shaped arrangement having a torsional spring cross piece connected to said second end of said spring arm to provide for greater flexibility of said mass and said spring arm; and a cap hermetically sealed to said MEMS structure where the cap includes a conductive pad, wherein said conductive pad of said mass engages said conductive pad of said cap when a predetermined acceleration of a G-switch is attained, and wherein said mass includes a first contact arm and a second contact arm both extending from a back of said mass and parallel to sides of said mass, wherein said first contact arm includes a first contact point and said second contact arm includes a second contact point where each of said first contact point and said second contact point is situated at ends of respective said first contact arm and said second contact arm thereof that extend past an end of said mass, and wherein said first contact point and said second contact point engage said conductive pad of said cap prior to said mass, during closing of said G-switch.

2. The G-switch according to claim 1, wherein said cap comprises a peripheral ridge and a cavity, which includes a ceiling, said conductive pad of said cap is deposited on said ceiling.

3. The G-switch according to claim 2, wherein said peripheral ridge includes an electrically conductive layer, said top device layer comprises a peripheral electrically conductive layer, and said electrically conductive layer on said peripheral ridge is bonded to said peripheral electrically conductive layer on said top device layer to form said hermetic seal.

4. The G-switch according to claim 1, further comprising a base on which said MEMS structure being positioned, wherein a first spaced electrically conductive layer and a second spaced apart electrically conductive layer are situated on said base, and wherein said MEMS structure include electrically conductive layers disposed such that when said G-switch is closed, current flow is established from said first electrically conductive layer on said base up through a bottom of said bottom substrate layer through said G-switch and out through said bottom substrate layer to said second electrically conductive layer on said base.

5. The G-switch according to claim 4, wherein said bottom substrate layer includes a first spaced apart cavity and a second spaced apart cavity positioned above respective said first electrically conductive layer and said second electrically conductive layer on the bottom of said bottom substrate layer; said first spaced apart cavity and said second spaced apart cavity are lined with electrically conductive layers and filled with an electrically conducting material.

6. The G-switch according to claim 1, wherein said mass is substantially a same thickness as said spring arm.

7. The G-switch according to claim 1, wherein said top device layer includes a first anchor portion and a second anchor portion; said mass includes a first end and a second end; said G-switch further comprises a first spring arm having a first end connected to said first end of said mass and a second end connected to said first anchor portion; said connection at said first anchor portion includes a T shaped arrangement having a torsional spring cross piece connected to said second end of said first spring arm; and a second spring arm having a first end connected to said second end of said mass and a second end connected to said second anchor portion, said connection at said second anchor portion including a T shaped arrangement having a torsional spring cross piece connected to said second end of said second spring arm.

8. The G-switch according to claim 7, wherein said mass includes a first contact arm and a second contact arm both extend from said first end of said mass and parallel to sides of said mass; said first contact arm and said second contact arm include respective first contact point and second contact point at ends thereof which extend past said second end of said mass; said first contact point and said second contact points engage said conductive pad of said cap prior to said mass, during closing of said G-switch; said mass includes a third contact arm and a fourth contact arm both extend from said second end of said mass and parallel to sides of said mass; said third contact arm and said fourth contact arm include respective third contact point and fourth contact point at ends thereof which extend past said first end of said mass; said third contact point and said fourth contact point engage said conductive pad of said cap prior to said mass, during closing of said G-switch.

9. The G-switch according to claim 7, wherein said mass includes a first contact arm and a second contact arm both extend from said first end of said mass and said mass includes a third contact arm and a fourth contact arm both extend from said second end of said mass, wherein said first contact arm and said second contact arm are connected to said first end of said mass by a torsional spring, wherein said third contact arm and said fourth contact arm are connected to said second end of said mass by a torsional spring, and wherein said first contact arm, said second contact arm, said third contact arm, and said fourth contact arm are operable to rotate out of the plane of said mass to engage said contact pad of said cap during closing of said G-switch.

10. The G-switch according to claim 1, wherein said top device layer includes a first anchor portion and a second anchor portion; said mass includes a first end and a second end; wherein said G-switch further comprises a first spring arm having a first end connected to said first end of said mass through a folded serpentine spring and a second end connected to said first anchor portion, wherein a connection at said first anchor portion includes a T shaped arrangement having a torsional spring cross piece connected to said second end of said first spring arm; wherein a second spring arm has a first end connected to said second end of said mass through a folded serpentine spring and a second end connected to said second anchor portion, wherein a connection at said second anchor portion includes a T shaped arrangement having a torsional spring cross piece connected to said second end of said second spring arm.

11. The G-switch according to claim 1, wherein said top device layer includes a first anchor portion, a second anchor portion and a third anchor portion; said mass includes three attachment points; said G-switch further comprises a first spring arm having a first end connected to a first attachment point of said three attachment points, and a second end connected to said first anchor portion where this first connection includes a T shaped arrangement having a torsional spring cross piece connected to said second end of said first spring arm; a second spring arm having a first end connected to a second attachment point of said three attachments points and a second end connected to said second anchor portion where this second connection includes a T shaped arrangement having a torsional spring cross piece connected to said second end of said second spring arm; and a third spring arm having a first end connected to a third attachment point of said three attachments points and a second end connected to said third anchor portion where this third connection includes a T shaped arrangement having a torsional spring cross piece connected to said second end of said third spring arm.

* * * * *